June 19, 1956 G. E. KELLY 2,751,430
TELEVISION COLOR SYNCHRONIZATION
Filed Nov. 1, 1951
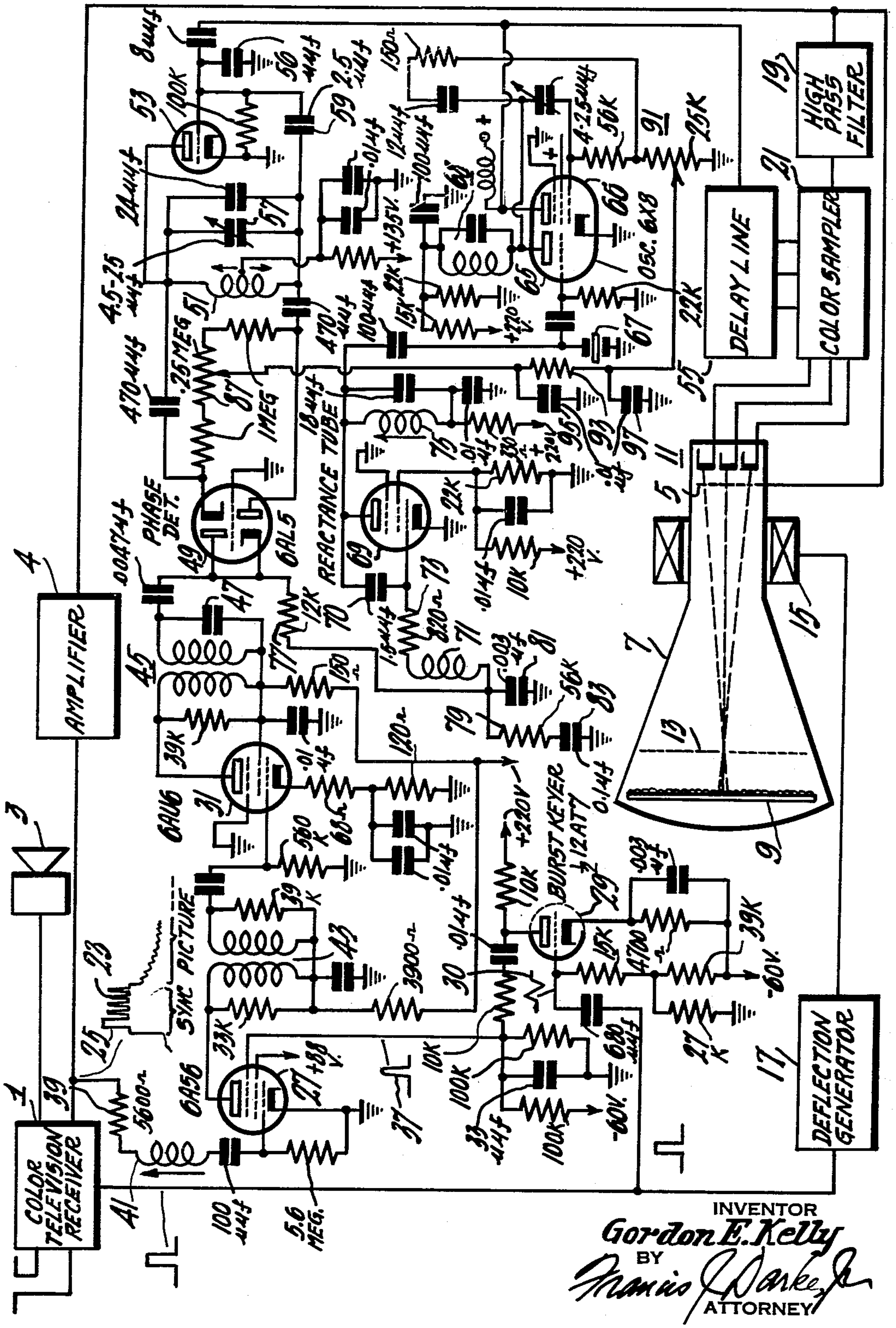
INVENTOR
Gordon E. Kelly
BY
Francis J. Darke Jr.
ATTORNEY 2,751,430
Patented June 19, 1956

2,751,430

TELEVISION COLOR SYNCHRONIZATION

Gordon E. Kelly, Westmont, N. J., assignor to Radio Corporation of America, a corporation of Delaware Application November 1, 1951, Serial No. 254,377
8 Claims. (Cl. 178—5.4)

This invention relates to television and more particularly to color synchronization of the type employed in color television receivers.

The reproduction on the viewing screen of a receiver of images in natural color requires not only an expression of the relative luminescenses or brightness but there must also be conveyed the color hues and saturation or chromaticities of elemental areas of the original scene.

The transfer of images in their natural color may be accomplished by additive methods. Additive methods produce natural color images by dividing the light from an object into a predetermined number of selected primary or component colors. Color images may be transferred electrically by analyzing the light from an object into not only its image elements as is accomplished by normal scanning procedure but by also analyzing the light from elemental areas of object or images into selected primary or component colors and deriving therefrom a signal train representative of each of selected component colors. A color image may be then reproduced at a remote point by appropriate reconstruction from the developed signal train.

In order to utilize the existing radio frequency spectrum most advantageously, there has been proposed a color television system based upon the signal multiplex principle which will be referred to herein as a "phase and amplitude modulated subcarrier wave" type. In such a system, the video signal components representative of the brightness detail are transmitted substantially in the usual manner for transmission of the black and white television signals. Color information is employed to modulate a subcarrier wave having a carrier frequency lying within the frequency pass-band of the aforementioned video signals carrying the brightness detail. The subcarrier wave is phase modulated in accordance with the particular component color being scanned while the same subcarrier is amplitude modulated in accordance with the chroma of the color being scanned. The system referred to is described in more detail beginning on page 122 of "Electronics" for November 1949.

Scanning synchronism between the transmitter and receiver is essential in the successful operation of television equipment. As a result, much emphasis is placed on the development and utilization of synchronizing methods. This is especially true in color television wherein not only is it necessary to maintain accurate deflection scanning but it is also necessary to maintain accurate synchronism in the timing of component color selection.

It will be seen that the reproduction of the proper color in the receiver is dependent upon accurate timing of the color selection in the receiver. Synchronism is accomplished by the periodic transmission of a 3.58 megacycle "burst" of signal wave equal in frequency to the unmodulated subcarrier carrying the color information.

A good description of the employment of the "burst" for color synchronization may be found in an article entitled "Recent Developments in Color Synchronization in the RCA Color Television System" published February 1950 by the Radio Corporation of America.

It is a primary object of the present invention to improve the timing of the color selection in a color television receiver.

Another object of this invention is to permit more accurate selection of color information.

According to this invention, a crystal oscillator circuit having a frequency of response equal to the burst frequency drives the color sampler. The burst is separated from the video signal by gating and compared with the output of the crystal oscillator in a phase detector. The phase detector output controls a reactance device across the crystal circuit to maintain proper phase relationship between the incoming burst and the locally generated sampling signal frequency.

Other and incidental objects of the invention will become apparent upon a reading of the following specification and an inspection of the accompanying drawing which shows by block and circuit diagram one form of the present invention.

Turning now in more detail to the figure of the drawing there is provided a color television receiver 1 which includes the appropriate circuits for developing video signals and sound signals. Suitable color television receivers may be found well shown and described in the publication entitled "General Description of Receivers for the RCA Color Television System which Employs the RCA Direct-View-Tri-Color Kinescopes" dated April 1950 and published by the Radio Corporation of America. The receiver may also take the form of the black and white television sets now in use. The sound signals are applied to the loud speaker 3.

Video signal is obtained from a color television receiver 1 and is applied through amplifier 4 to the control electrode 5 of a color image reproducing device or tri-color kinescope 7. It is not the intention here to limit the practice of the present invention to any single type of color image reproducing device. For the purpose of explanation of the operation of this invention, the three gun tri-color kinescope will be illustrated. The color kinescope 7 includes a luminescent screen 9 formed of a multiplicity of small phosphor dots of sub-elemental dimensions and arranged in groups to be capable of producing the selected component colors when excited by a particular color designated electron beam from gun structure 11.

An apertured mask 13 is interposed between the three guns 11 and the dot-phosphor screen 9 in such a manner that the electrons from any one gun can strike only a single color phosphor no matter which part of the raster is being scanned. The mask 13 is comprised of a sheet of metal spaced from the phosphor screen. In a model which has operated satisfactorily the mask 13 contains 117,000 holes, or one hole for each of the tri-color-dot groups. This hole is so registered with its associated dot group that the difference in the angle of approach of the three oncoming beams determines the color. Thus, three color signals applied to the three guns 11 produce independent pictures in the three selected component colors, the pictures appearing to the eye to be superimposed because of the close spacing of the very small phosphor dots. A further description of the operation and structure of the tri-color kinescope may be found in an article entitled, "General Description of Receivers for Dot-Sequential Color TV System which Employ Direct View Tri-Color Kinescopes" published in the RCA Review for June 1950, and "The Proceedings of the Institute of Radio Engineers" for October 1951.

The last article referred to immediately above also shows arrangements for obtaining color purification and dynamic convergence energy which are necessary for the proper operation of the color reproducer. The details of such elements do not form a part of this invention and will therefore be omitted from the drawing and specification.

A suitable scanning deflection yoke 15 or other deflecting means is provided for scanning. Appropriate scanning deflection energy for deflection coil 15 is supplied by deflection generator 17, which may also take any of the well known forms employed in the television art. Details concerning deflection may be found in an article entitled "Television Deflection Circuits" by A. W. Friend, published in the RCA Review for March 1947.

It will be noted that the incoming video signal from the color television receiver 1 is applied to the control electrode 5 which is common to all the cathodes of cathode gun structure 11 of kinescope 7. This path is essentially the same as the output system of conventional black and white receivers except in an actually constructed and operating equipment there is included a delay circuit and a video peaking circuit which is not shown here.

A second signal path for the video signal from color television receiver 1 feeds a simple high pass filter 19 whose band pass characteristic is adjusted to contain the low frequency color information on the subcarrier. If, for example, a carrier frequency of 3.58 megacycles is selected, the band pass characteristic of filter 19 will include nominally 2–4 megacycles. This will include the subcarrier of 3.58 megacycles and one of its side bands.

In order to cause the proper electron beam to excite the designated color phosphor on screen 9 to the extent desired, it is necessary to appropriately bias the cathodes of the gun structure 11. This action is accomplished in color sampler 21. This color sampler 21 may consist of three phase and amplitude detectors or gating tubes. The signal obtained from filter 19 is applied to the sampler 21. There are three separate phase indicating potentials developed in color sampler 21. Each phase indicating potential is representative of the phase difference between the color synchronizing burst and a different one of the three single frequency datum signals having relative phase displacement with respect to one another of 120°. The phase indicating potentials are applied respectively to the cathodes of the different electron guns of the gun structure 11. Another form of sampler employing diodes is generally referred to as a "balanced modulator" or "sine wave sampler." It is shown and described in the co-pending United States application of G. C. Sziklai entitled "Multiplex Systems," Serial No. 169,594, filed June 22, 1950.

It is, of course, essential to the proper operation of the color sampler 21 regardless of the form it might take that it be furnished a control signal accurate with respect to the transmitter in phase and frequency to enable proper color selection.

In order to accurately time the color selection in the receiver a color synchronizing burst 23 is transmitted immediately following the deflection scanning synchronizing pulses 25. This is shown in the wave form illustrated at the video output of the television receiver 1.

The elements shown by circuit diagram in the drawing are employed in accordance with one form of this invention for accurately timing the color sampler 21 in order that it will cause the proper color reproduction in color kinescope 7.

In order to provide color sampling synchronization it is necessary to separate from the composite video signal obtained from color television receiver 1, a color synchronizing signal which consists of a "burst" of signal having a frequency of 3.58 megacycles. This signal referred to above is located on the "back porch" of the transmitted signal and takes the form illustrated at number 23 in the upper left hand corner of the drawing. This separation of the "burst" from the remainder of the video signal is accomplished in burst amplifier tube 27. "Burst" amplifier tube 27 is keyed into operation only during the "burst." This is accomplished through burst keyer tube 29 which has applied to its control electrode differentiated positive synchronizing pulse obtained from color receiver 1. A study of the graphical illustration of the differentiated pulse 30 applied to the control electrode of tube 29 will indicate that a positive portion of the pulse will be applied to the keying or suppressor electrode of 27 only during the "back porch" which contains the "burst." This will cause tube 27 to be operative or to pass signal energy during the "back porch" only.

The burst amplifier includes tube 27 and tube 31. In operation, a positive pulse 37, derived from the differentiated pulse 30, is applied to the suppressor electrode of tube 27. Pulse 37 has an approximately peak to peak voltage of 60 volts. The suppressor of tube 27 has a fixed bias of approximately minus 30 volts. The tube 27 will therefore conduct only on the positive peak of the gating pulse 37. The gating pulse 37 has a rounded sine wave type shape an advantage in that it does not add undesirable transients to the burst signal. Additional amplitude separation is provided by using grid leak bias for tube 27 which sets up on the positive peaks of horizontal sync, with the proper screen grid voltage tube 27 cuts off at about blanking level. In addition, an input circuit comprising of resistance 39, inductance 41 and the input capacity of the tube 27 provides six db of attenuation at 3.58 megacycles which eliminates presence of this type of signal in the super black region at maximum chroma signals.

The input circuit provides an additional function in that it shifts the phase of the 3.58 megacycle burst by 90° as well as permitting a variable shift of ±30° by adjusting the value of inductance 41. The plate and grid circuit of tube 27 to tube 31 is coupled by transformer 43, which has a center frequency of 3.58 megacycles and a band-width of approximately .8 megacycle. The band-width is the minimum required to pass the burst pulse with reasonable fidelity and the coupled transformer 43 provides rejection at the edges of the band to eliminate harmonics.

The second burst amplifier tube 31 provides additional clipping of the burst signal and the use of a band pass plate circuit again assists in rejecting harmonics such that the output burst signal is symmetrical in its wave form. Transformer 45 uses additional capacity 47 to provide a low impedance source for the phase detector 49. The burst output from transformer 45 is approximately 100 volts peak to peak.

The phase detector 49 requires a push-pull C. W. signal on one side and the burst on the other. The push-pull signal is provided by a center tapped transformer 51 driven by tube 53 which receives its signal from the local oscillator 65. In practice, the phase of the signal applied to tube 53 may be changed by driving from some point along the delay line 55. Transformer 51 is balanced by means of a center core and tuned by a ceramic trimmer 57. Tube 53 is neutralized by condenser 59 which should be equal to the grid to plate capacity of tube 53. The phase detector 49 operates most efficiently when the push-pull signal is one-half to one-third the amplitude of the burst signal. To obtain the maximum pull-signal the burst must be at least two times the amplitude of the steady state signal . Also with one signal, the larger the phase detector output has less variation for amplitude changes of this signal. The direct current output of the phase detector 49 will be zero at 90° phase difference and will follow a sine curve with a maximum of ±15 volts at zero degrees and 180°. Hence it has its greatest slope about the 90° point.

The phase detector 49 compares the phase of the incoming "burst" with the phase of the local oscillator which in the present form of the invention consists of a double section tube having as its first section 65 the local oscillator and its output section 66 the local oscillation amplifier stage. Oscillator 65 is adjusted as close to the sampling frequency as possible and is controlled by crystal element 67.

The oscillator circuit employs the crystal 67 in a tuned grid tuned plate circuit and uses a low L—C plate circuit 68 to provide a steep reactance curve in the region of 3.58 megacycles. This is to prevent oscillation in other modes. It rquires no additional feedback other than the grid to plate capacity of the oscillator 65.

The control voltage obtained in phase detector 49, as a result of comparing the incoming synchronizing burst with the locally generated oscillations of oscillator 65, is applied to reactance tube 69 which provides a capacitative type reactive current by virtue of the capacity feedback through condenser 70. To provide a true 90° shift of plate current to plate voltage, inductance 71 is placed in series with the control electrode resistor 73. This provides loading of the oscillator 65 over zero bias conditions. The reactance tube plate coil 75 provides a means of tuning the oscillator 65 as well as providing plate voltage for the reactance tube 69. The combination provides a variation of about 600 cycles from zero bias cut-off of the reactance tube 69 when employing a burst frequency of 3.58 megacycles.

The phase detector 49 and the reactance tube 69 are connected by resistance 77, resistance 79, condenser 81 and condenser 83. Resistance 77 provides a direct current path to the reactance tube 69 as well as a load for the secondary of the burst amplifier transformer 45. Condenser 81 causes a low frequency cut-off of the link for noise effect reduction as well as a 3.58 megacycle by-pass. Resistance 79 and condenser 83 provide an anti-hunt network and effectively damp any hunting effect due to lack of burst during vertical sync.

The phase detector 49 is connected in series with the reactance tube grid circuit and has a balancing potentiometer 87 to provide for any differences in resistor or diode cathode leakage. The reactance tube 69 receives its nominal bias for center frequency from a well regulated source designed to provide a minimum of drift with line voltage variations. The oscillator 65 drives 3.58 megacycles driver tubes 66 and 53 which operates from grid leak bias. The bias resistor 91 is tapped such that the lower section of resistor 91 provides a variable source of negative voltage. In addition, when the line voltage drops, the oscillator strength decreases and also the grid leak current of the driver tubes decreases such that the reactance tube bias drops causing a correction effect. Total variation amounts to less than 30 cycles for extremes (105 v. to 125 v. A. C.) in line voltage conditions.

A decoupling circuit is provided by resistance 93, condenser 95 and condenser 97. This decoupling circuit connects the bias source to the phase detector 49. Under operating conditions, the unit provides a pull-in range of ±300 cycles and accuracy within ±2 degrees of phase error.

Details concerning the delay line 55 may be found in the papers on color television referred to above or any of the text books including information on the delay lines. The first sections of the delay line serve to eliminate harmonics generated in tube 66 and to provide an impedance match between tube 66 and the subsequent sections of the delay line 55. Signals are taken from the delay line 55 at three intervals at which the phase of the signals differ by 120°. These sampling voltages are applied to the gating control electrodes of the sampling tubes of color sampler 21.

It will be seen that the color sampler control energy received from delay line 55 will cause there to be applied at the gun structure 11 the color reproduction signal which is at that instant being scanned at the transmitter. If, for example, a red point on the image at the transmitter is being scanned at a particular instant, the transmitted signal will include a subcarrier whose frequency is equal to the frequency of the burst and whose phase difference is an indication of the red color. At that particular instant as a result of the application of a frequency equal to the burst frequency being applied to the delay line 55 and hence to the color sampler 21 only the red representative cathode of gun structure 11 will be biased to permit electrons to follow to the target area 9 and produce only a red color. The same action is true during the scanning of a green or a blue element of the image except that the phase of the phase and amplitude modulated subcarrier is different.

In the above description of the operation of the present invention, a color synchronizing burst frequency of 3.58 megacycles was employed. It is not intended to limit the practice of this invention to that particular frequency, or the particular sampling angles mentioned. That particular frequency has been successfully employed in the operation of the present invention.

There is also included in the drawing capacitive and resistance value as well as tube types. These indicated values and tube types are also given for illustrative purposes and it is not intended to limit the invention thereto. The values illustrated in the drawing have proved very satisfactory in operation.

Having thus described the invention, what is claimed is:

1. In a color television receiver employing a color synchronizing burst for color synchronization, a color synchronizer comprising in combination a color sampler, an oscillator connected to said color sampler for driving said color sampler, a piezo-electric crystal for stabilizing the frequency of said oscillator, means for comparing the phase of the output of said oscillator with the phase of said burst and developing control energy therefrom, and means for applying said control energy to said piezo-electric crystal.

2. In a color television system of this type employing a color synchronizing burst, a color synchronizing circuit comprising in combination, a piezoelectric crystal circuit timed approximately to the frequency of said burst, means for developing a control voltage whose magnitude is dependent upon the phase difference of the signal developed by said piezoelectric crystal circuit and said color synchronizing burst, means for applying said control voltage to said crystal circuit to control the frequency of said crystal circuit, a color selection sampler having a frequency control terminal, and a connection between said piezoelectric circuit and said color sampler frequency control terminal.

3. The invention as described in claim 2 and wherein a reactance tube is included in said means for applying said control voltage to said crystal circuit.

4. The invention as described in claim 2 and wherein said piezoelectric crystal circuit includes a tuned grid tuned plate circuit.

5. The invention as described in claim 2 and wherein there is included an amplifier for said burst responsive only during the time interval occupied by said burst.

6. In a color television receiver employing a color synchronizing burst for color synchronization and scanning sync for deflection synchronization, a color synchronizer comprising in combination a color sampler, an oscillator connected to said color sampler for driving said color sampler, a frequency controlling element including a crystal for stabilizing the frequency of said oscillator, and a burst amplifier, said burst amplifier having grid leak bias at a point where scanning sync is in a positive direction.

7. In a color television receiver employing a color synchronizing burst for color synchronization, the combination of means for developing a video signal, an image reproducer, a color sampler, an oscillator connected to said color sampler for driving said color sampler, means to apply the color synchronizing burst to said oscillator, a frequency controlling element including a crystal for stabilizing the frequency of said oscillator, and a frequency responsive circuit arranged to attenuate signals of a frequency corresponding to the frequency of the burst that are delivered to said image reproducer and to accentuate signals of frequency of the burst that are applied to said oscillator.

8. The invention as described in claim 7 and wherein said frequency responsive circuit is capable of shifting the phase of the accentuated burst by an amount adjustable during operation.

References Cited in the file of this patent

UNITED STATES PATENTS

| | | |
|---|---|---|
| 2,319,789 | Chambers | May 25, 1943 |
| 2,378,746 | Beers | June 19, 1945 |
| 2,399,421 | Artzt | Apr. 30, 1946 |
| 2,539,465 | Parker | Jan. 30, 1951 |
| 2,546,972 | Chatterjea | Apr. 3, 1951 |